Patented May 8, 1951

2,552,325

UNITED STATES PATENT OFFICE 2,552,325

DIETHYL OCTYL PHOSPHATES

Gennady M. Kosolapoff, Dayton, Ohio, assignor to Monsanto Chemical Company, St. Louis, Mo., a corporation of Delaware No Drawing. Application February 24, 1947, Serial No. 730,533

3 Claims. (Cl. 260—461)

This invention relates to insecticidal products.

An object of this invention is to provide new and useful mixed esters of phosphoric acid. A further object is to provide insecticidal compositions containing certain mixed esters of phosphoric acid.

This invention provides new esters of orthophosphoric acid having the general formula:

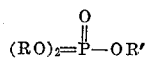

where R is an alkyl group having from 2 to 5 carbon atoms and R' is an octyl group.

In the above general formula R may be either ethyl, propyl, isopropyl, butyl, isobutyl, secondary butyl, amyl or isoamyl, while R' may be either n-octyl or 2-ethylhexyl.

The present compounds may be prepared by the general method involving the chlorination of the dialkyl phosphite to form the corresponding dialkyl chlorophosphate, after which the dialkyl chlorophosphate is reacted with an alkali metal octylate according to the following reaction:

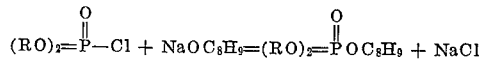

The preparation of the above mixed esters of phosphoric acid may be further illustrated by the following method describing the preparation of the diethyl (2-ethylhexyl) phosphate.

Example 1

70 grams of diethyl phosphite was chlorinated at a temperature below 15° C. and a chlorinated product consisting of diethyl chlorophosphate obtained. In a separate vessel 65 grams of 2-ethylhexyl alcohol in 250 cc. of toluene is treated with 11.5 g. of sodium. Upon the completion of the reaction the diethyl chlorophosphate was added to the sodium 2-ethyl hexanoate. The resulting mixture was refluxed for one hour, cooled, washed and then distilled. A product consisting of 85 g. of diethyl (2-ethylhexyl) phosphate was obtained as a yellowish oil boiling at 135° C. to 140° C. at 5 mm. pressure.

Example 2

The corresponding diethyl (n-octyl) phosphate may be prepared in the following manner:

Chlorine gas is passed into 35 g. of diethyl phosphite at a temperature below 15° C. In a separate vessel 32.5 g. of n-octanol dissolved in 400 cc. of xylene is treated with sodium metal in sufficient quantity to produce the sodium n-octoxide. To the sodium n-octoxide is added the diethyl chlorophosphate obtained above. The resulting mixture is refluxed for two hours, cooled, washed with water and then distilled. The product consisting of 35 g. of diethyl (n-octyl) phosphate is obtained as a colorless oil having a boiling point of 154° C. to 157° C. at 10 mm. $n_D^{25}=1.4210$.

For the purpose of combating insect pests the present mixed alkyl esters of phosphoric acid may be employed as the active ingredient of the insecticidal composition which may be either a dust, a solution or an emulsion.

The present materials undergo slow hydrolysis in aqueous solution so that if it is desired to store the product in form ready for application it should preferably be maintained in the anhydrous or water-free condition. If the insecticidal composition is prepared in non-anhydrous form, the material should be utilized shortly after preparation in order to realize the maximum effectiveness of the active ingredient.

The mixed alkyl phosphates herein disclosed may be dissolved in organic solvents such as carbon tetrachloride, ethylene dichloride, alcohol such as ethyl, isopropyl, or higher alcohols, esters such as ethyl acetate or an aromatic solvent such as benzene, ortho-dichlorobenzene, toluene or xylene. The esters may also be dissolved or emulsified with the usual petroleum solvents utilized for this purpose. Suitable emulsions may be made by dissolving the active material in xylene or the like adding an emulsifying agent and then when the material is to be used adding the xylene solution to water in the proper concentration.

The products may also be mixed in various proportions with finely divided carrier solids such as powdered sulfur, talc, pyrophyllite, bentonite, wood flour, starch, carbon black, etc. and the powder used as an insecticidal dust in the usual manner.

The powders, solutions or emulsions may be applied to insect infested vegetation by mechanical dusting or by atomizing the liquid solution or emulsion in the customary manner.

When the present active compounds are employed in combination with solvents, dusts or in emulsified form they maintain their initial high activity over a very high range of dilution and may be used without injury to the host plant.

The present products are useful for combating those pests against which nicotine sulfate or other salts has been used in the past, such as, for example, flies, moths, beetles, plant lice, etc.

The present mixed alkyl phosphates may be used alone as a substitute for nicotine, or they may be combined with various nicotine salts in various proportions and a combination insecticide obtained having increased effectiveness against insect pests. The present products may also be combined with alpha,alpha-di-(p-chlorophenyl) beta,beta,beta-trichloroethane (DDT) in various proportions.

When the mixed alkyl phosphate herein disclosed is used against insect pests upon fruits and vegetables it has been found that the spray residue left upon the fruit or vegetable rapidly becomes non-toxic to animal organisms. This effect, while not completely understood, is thought to be the result of the hydrolysis of the mixed alkyl ester, which reaction is believed to be induced by the moisture of the air. As a result, spray residues of the present phosphates which are several or more days old need generally not be removed by washing, as is the case with nicotine or other poisonous insecticides.

The following examples serve further to illustrate the present invention:

*Example 3*

One part by volume of the product produced in Example 1 above was dissolved in 2,000 parts by volume of xylene and sprayed upon the aphid *Myzus porosus* infesting excised rose leaves. The number of insects killed and moribund after 24 hours were counted. Five replicates were made in this way and the results averaged. The averaged results indicated that 96.2% of the insects had been killed with 1.9% moribund. There was no injury to the foliage.

*Example 4*

One part by volume of the product produced in Example 1 was dissolved in 5,000 parts of xylene and the solution then sprayed upon infested rose leaves as in Example 3. Five replicates showed an average kill of 71.4% with 3.0% moribund.

*Example 5*

One part by volume of the product produced in Example 1 was dissolved in 10,000 parts of xylene and the solution sprayed upon infested rose leaves as in Example 3. Five replicates showed a kill of 48.7% with 3% moribund.

*Example 6*

One part by weight of dibutyl (n-octyl) phosphate is added to 100 parts of a dust consisting of bentonite and thoroughly mixed therewith. The dust is then applied to vegetation infested with red spiders. A good kill of red spiders is obtained in this manner.

*Example 7*

One part by weight of diamyl (2-ethylhexyl) phosphate is added to 200 parts of a dust consisting of finely ground pyrophyllite and thoroughly mixed therewith. Upon application to aphid infested vegetation an excellent kill of aphids is obtained.

The present alkyl esters which contain a single octyl group, together with two shorter chain alkyl groups, which alkyl groups have a chain length which is at least 3 carbon atoms shorter than the octyl chain, possess an insecticidal activity which is strikingly greater than that of nicotine, the insecticide which has in the past been extensively used against insects such as aphids and red spiders. It is also considerably more active than the previously known tri-(2-ethylhexyl) phosphate, which compound has an insecticidal activity below that of nicotine.

In comparable tests to those described above, these compounds showed the following insecticidal activity:

|  | Dilution | Insect | Per Cent Kill | Per Cent Moribund |
|---|---|---|---|---|
| Nicotine | 1/2000 | *M. Persicae* | 75.2 | 13.3 |
| Do | 1/2000 | *M. Porosus* | 48.8 | 4.4 |
| Tri-(2-ethylhexyl)-phosphate | 1/500 | *M. Persicae* | 87.1 | 0.7 |
| Do | 1/500 | *M. Porosus* | 51.1 | 1.8 |

The aphid *M. porosus* is known to be considerably more resistant to the action of toxicants than is *M. persicae*. However, even under conditions of greater dilution, the compounds of the present invention have been found to be very much more potent than nicotine as well as tri-(2-ethylhexyl) phosphate.

What I claim is:

1. Diethyl(n-octyl) phosphate.
2. Diethyl(2-ethylhexyl) phosphate.
3. Compounds having the formula:

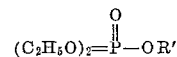

where R' is selected from the group consisting of the n-octyl and 2-ethylhexyl radicals.

GENNADY M. KOSOLAPOFF.

REFERENCES CITED

The following references are of record in the file of this patent:

UNITED STATES PATENTS

| Number | Name | Date |
|---|---|---|
| 1,799,349 | Bannister | Apr. 7, 1931 |
| 1,844,408 | Nicolai | Feb. 9, 1932 |
| 1,869,768 | Nicolai | Aug. 2, 1932 |
| 1,955,207 | Stotter et al. | Apr. 17, 1934 |
| 2,005,619 | Graves | June 18, 1935 |
| 2,080,299 | Benning | May 11, 1937 |
| 2,176,416 | Britton et al. | Oct. 17, 1939 |
| 2,370,786 | Fox | Mar. 6, 1945 |
| 2,426,691 | Jenkins | Sept. 2, 1947 |

FOREIGN PATENTS

| Number | Country | Date |
|---|---|---|
| 885,686 | France | June 7, 1943 |

OTHER REFERENCES

Adler et al.: Chemical Industries, October 1942, pages 516 to 521.